Figure 4:
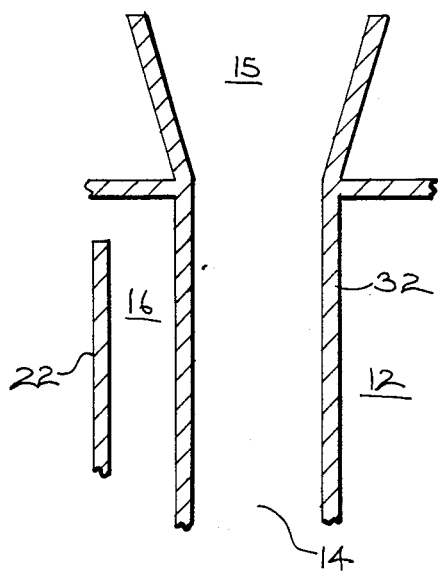

United States Patent [19]

Kröber

[11] Patent Number: 4,581,848
[45] Date of Patent: Apr. 15, 1986

[54] HYDRO-TANK FOR HYDROPONICS

[76] Inventor: Lutz Kröber, Abbachstrasse 24, Munich, Fed. Rep. of Germany, 8000

[21] Appl. No.: 718,202
[22] PCT Filed: Apr. 29, 1982
[86] PCT No.: PCT/DE82/00095
§ 371 Date: Dec. 29, 1982
§ 102(e) Date: Dec. 29, 1982
[87] PCT Pub. No.: WO82/03746
PCT Pub. Date: Nov. 11, 1982

[30] Foreign Application Priority Data

Apr. 30, 1981 [DE] Fed. Rep. of Germany ....... 3117262

[51] Int. Cl.$^4$ ............................................. A01G 31/02
[52] U.S. Cl. ........................................................ 47/79
[58] Field of Search ...................... 47/59–65, 47/66, 79, 82

[56] References Cited

U.S. PATENT DOCUMENTS

| 3,557,490 | 1/1971 | Delaney | 47/81 |
| 3,753,315 | 8/1973 | Adam | 47/79 |
| 4,085,546 | 4/1978 | Hallar | 47/59 |
| 4,148,155 | 4/1979 | Allen | 47/59 |

FOREIGN PATENT DOCUMENTS

| 1582806 | 5/1970 | Fed. Rep. of Germany. | |
| 7506994 | 8/1975 | Fed. Rep. of Germany. | |
| 7506993 | 9/1975 | Fed. Rep. of Germany. | |
| 2503502 | 8/1976 | Fed. Rep. of Germany. | |
| 2509724 | 9/1976 | Fed. Rep. of Germany | 47/79 |
| 7636631 | 11/1976 | Fed. Rep. of Germany. | |
| 2554108 | 6/1977 | Fed. Rep. of Germany | 47/59 |
| 2634037 | 2/1978 | Fed. Rep. of Germany | 47/79 |
| 417127 | 7/1974 | U.S.S.R. | 47/62 |

OTHER PUBLICATIONS

"Mehr Blumenfrude durch Hydrokultur" mentioned in last paragraph of p. 1 of the English Specification.

Primary Examiner—Robert A. Hafer
Assistant Examiner—Danton DeMille
Attorney, Agent, or Firm—Andrus, Sceales, Starke & Sawall

[57] ABSTRACT

A tank (10) for the irrigation of plants in hydroponic cultivation maintains intermittently and automatically the water level in the tank and simultaneously controls the filling opening without mechanical closure. The tank is comprised of elements forming an enclosing container with an annular section. It is divided into three chambers: a storage chamber (12), another chamber open at its upper portion forming a filling channel (14), in connection at its lower portion with the storage chamber, and a third chamber called the filling chamber (16), connected by its upper portion to the storage chamber through an overflow-shoot and, by its lower portion, to the plant container through vertical slots (24). The width of these slots is such that they form a sealing weir due to the surface tension of the water as long as the level is under a predetermined minimum point. The storage chamber and the container are connected through an opening (26) which, due to its arrangement and size, throttles the flow.

10 Claims, 7 Drawing Figures

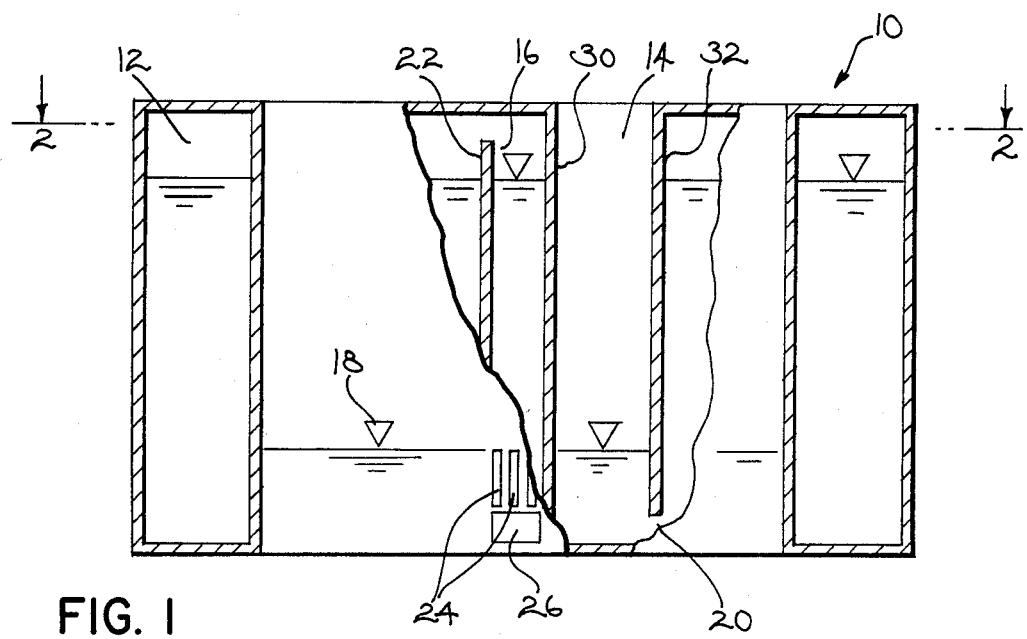
FIG. 1
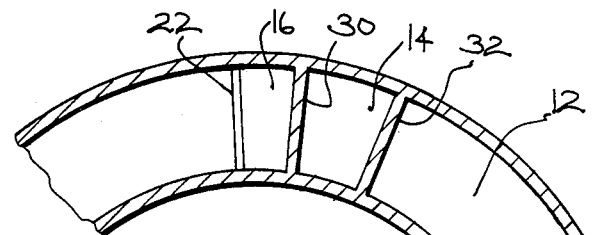
FIG. 2
FIG. 3
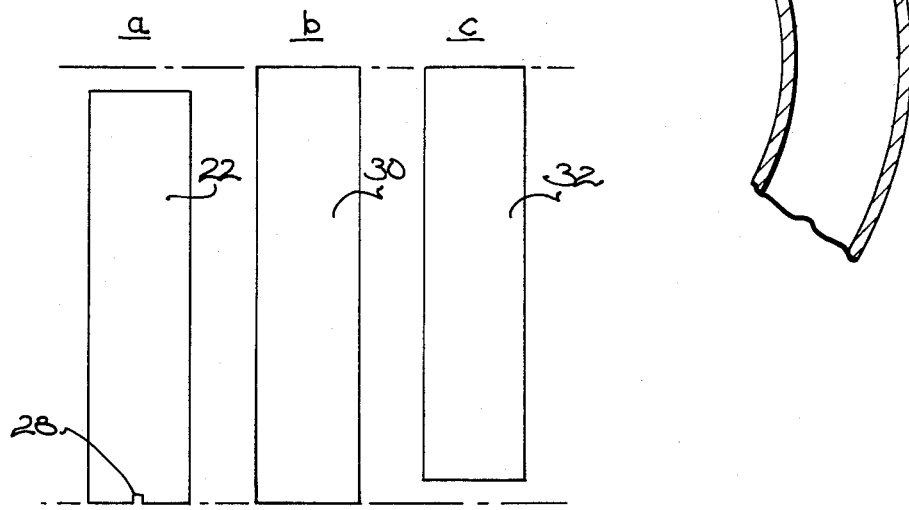

HYDRO-TANK FOR HYDROPONICS

The invention relates to a hydro-tank for hydroponics, comprising a closed storage tank which extends down below the level of nutritive solution desired in the cultivating pot, having a separating filling channel in or on the storage vessel, the outlet of which is located near the bottom of the cultivating pot and communicates with the storage tank, and having a connection between the storage tank and the cultivating pot.

As every lover of flowers knows, it is good for plants to dry out, so to speak, every now and then instead of being constantly kept wet; and all business enterprises for hydroponics point out in their water instructions that the water level should sink to the bottom before the tank is filled up anew. Neither prior art nor the market does justice to this fact when it comes to the water supply for house plants. All proposals and all systems on the market aim at maintaining a certain water level.

Examples of this kind of outer pot, albeit for earth culture, can be found, for example, in utility model prints U.S. Pat. Nos. 7,506,994 and 7,506,993. The common feature of all these proposals is the constant water level in the plant vessel proper. Various proposals are furthermore disadvantageous in that they do not allow for the tank to be filled up intermediately or require a particularly elaborate airtight closure construction for the tank.

It is explained in a standard work dealing with matters of hydroponics (Margot Schubert, Mehr Blumenfreude durch Hydrokultur (More Pleasure in Plants with Hydroponics), BLV Verlagsgemeinschaft Munich, Bern, Vienna, 6th edition, 1979) that the basic problem involved in using hydroponics consists in the water supply. To solve this precarious problem the standard work suggests a sort of bird trough comprising a closed cylinder which rotates around its principal axis and is turned downward in a full state, thus keeping the liquid level in the plant vessel constant at a certain height. It is obvious that this solution has an unfavorable effect on the shape of the cultivating pot. Lovers of flowers, however, usually also make certain aesthetic demands and tend to refuse a shape of cultivating pot which is determined purely by technical considerations.

The invention is thus based on the problem of providing a hydro-tank for hydroponics which interferes as little as possible with the aesthetic design of cultivating pots and furthermore does justice to the peculiarities of plants insofar as it generates an automatically interrupted liquid level in the cultivating pot.

This problem is solved according to the invention for a hydro-tank as described at the outset by providing a separate filling chamber which communicates with the storage tank by means of an overflow and communicates with the cultivating pot by means of vertical slots in its lower area, the height of the slots defining the liquid level in the cultivating pot, and further by a small throttling opening provided near the bottom of the cultivating pot between the storage tank and the cultivating pot, or the storage tank and the filling chamber.

Further advantageous embodiments of the invention are the subject-matter of the subclaims.

Designing the hydro-tank as a separate element is advantageous in that cultivating pots already on the market can subsequently be equipped with the inventive hydro-tank any time. The tank can be sunk in the substrate filling practically invisibly.

Designing the hydro-tank as an element with a circular cross-section is mainly advantageous in that it is possible to accommodate the tank practically invisibly when using round, cylindrical pots. Storage of this kind of hydro-tank is also simplified since tanks of different diameters may be telescoped.

The width of the slots should preferably be such that the nutritive solution forms a meniscus between the edges of the slots due to its surface tension. This meniscus virtually seals off the volume contained in the filling chamber to start with, and prevents it from flowing into the cultivating pot before the level in the latter has sunk to a minimum. Only then does the liquid in the filling chamber break through the slots and set the filling of the cultivating pot going through the throttling opening located either between the storage tank and the cultivating pot or between the storage tank and the filling chamber.

Preferably, the volume of the filling chamber is small relative to the volume of the liquid contained in the cultivating pot. Only in this way can be it guaranteed that the filling chamber becomes perfectly empty when the minimum level is attained in the cultivating pot.

In order that the cultivating pot be filled as quickly as possible after "response" or reduction below the minimum level in the cultivating pot, it is advantageous when the exit aperture defined by the slots is wider in the vicinity of the bottom.

The inventive hydro-tank allows for the first time intermittent watering of plants using a simple hydromechanical stopping means. The slots fulfill a sort of control function in the process.

In the following, an embodiment of the invention shall be described by way of example with reference to the adjoined drawings. These show:

FIG. 1 a vertical section of a hydro-tank according to a first embodiment

FIG. 2 a horizontal section of this hydro-tank

FIGS. 3a lateral views of the partitions arranged in to 3c the hydro-tank

Figure 5:
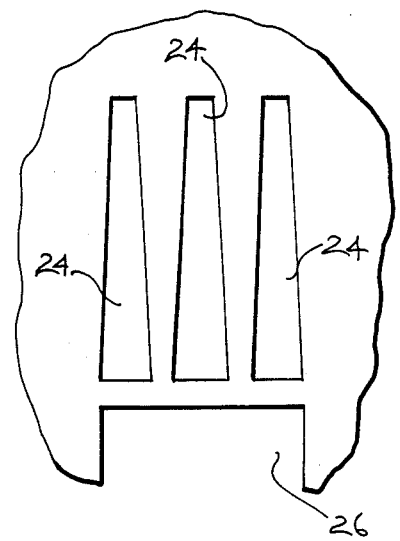
Figure 6:
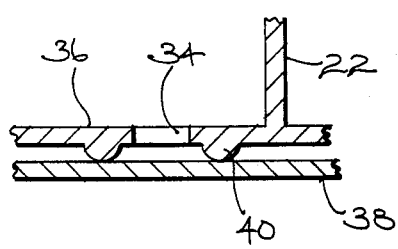
Figure 7:
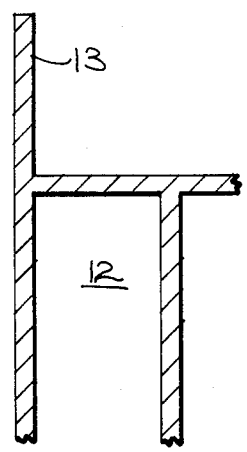

FIG. 4, a fragmentary, cross sectional view showing a funnel on the opening of the filling channel FIG. 5, a fragmentary view showing a modification of the slots FIG. 6, a fragmentary, cross sectional view showing the throttle opening discharging in the cultivating pot FIG. 7, a fragmentary view showing an upwardly extending edge on the storage tank The Figures show a hydro-tank 10 designed as a separate element. The hydro-tank essentially comprises a hollow body shaped like a cylinder barrel containing the storage tank proper 12, the filling channel 14 and the filling chamber 16. The arrangement of the various chambers can be seen most clearly in FIG. 2.

Hydro-tank 10 is inserted into a cylindrical cultivating pot, the inside diameter of which corresponds approximately to the outer diamter of hydro-tank 10. The hydro-tank rests on the bottom of the cultivating pot. The level of the liquid in the cultivating pot is indicated by arrow 18. Near the lower edge of the hydro-tank or the bottom of the cultivating pot, filling channel 14 has an aperture 20 connected with the storage tank proper. Filling channel 14 may have the funnel shaped extension 15 of the filling opening shown in FIG. 4. Filling chamber 16 is separated from storage tank 12 by a wall 22 which does not extend up to the cover wall of storage tank 12. In this manner a weir-like overflow is created, which assures a connection between the tank and the filling chamber.

Vertical slots 24 are formed in the lower wall separating filling chamber 16 from the liquid volume located in the cultivating pot. In the embodiment shown, the slots do not quite extend to the bottom of the cultivating pot, but rather a mouth-like opening 26 is formed in the lower area. The upper end of slots 24 defines the maximum normal water level in the cultivating pot. As shown in FIG. 5, the lower ends of slots 24 may be wider than the upper ends.

A small throttling opening 28 is arranged in the partition 22 between storage tank 12 and filling channel 14 near the bottom (FIG. 3). This throttling opening 28 could also be arranged in the walling of the storage tank which separates the storage tank from the liquid volume in the cultivating pot (FIG. 6). The arrangement shown in FIG. 3, however, is advantageous insofar as it greatly reduces the danger of throttling opening 28 being clogged by roots.

In FIG. 3 the partitions between the various chambers are shown separately, FIG. 3a showing a lateral view of partition 22. One can see that partition 22 does not fill up the entire height of the storage tank, so that its upper edge forms an overflow into the filling chamber proper 16. Partition 30 between the filling chamber and filling channel 14 is uninterrupted. It does not exhibit any opening. This wall is shown in FIG. 3b. Partition 32 between filling channel 14 and storage vessel 12 is shown in FIG. 3c. One can see that a passage is formed near the bottom from the filling channel into the storage tank.

The hydro-tank functions in the following way. After it has been inserted empty into a cylindrical cultivating pot, the pot is filled through the upper opening of filling channel 14. The water enters into storage tank 12 through connecting opening 20 from filling channel 14, and slowly rises in the tank. Ventilation takes place by means of filling chamber 16 and slots 24 or opening 26. When the level in storage tank 12 has risen to the upper edge of partition 22, the overflowing water fills the cultivating pot up to the level indicated in FIG. 1 by arrow 18. This filling may take place relatively rapidly, since the water overflows into the cultivating pot proper through the exit aperture of slots 24 and opening 26. The rise of the liquid level in the cultivating pot should be pursued by a corresponding water level indicator so that the maximum normal level is not exceeded. This water level indicator is usually connected with an insert containing the actual substrate in which the plant is set. In the case described, this insert should have an outer diameter corresponding to the inner diameter of the circular storage tank 12. This kind of insert is usual and readily available on the market.

After the cultivating pot has been filled, the liquid absorption of the plant and evaporation lead to a gradual decrease in the liquid level in the cultivating pot; the liquid level drops to the position shown in FIG. 1. At first there will be no subsequent flow of liquid out of filling chamber 16, however, since slots 24 prevent subsequent flow due to menisci formed by surface tension between the edges of the slots. Only when the liquid level approaches the lower end of the slots is the hydrostatic pressure acting on the menisci so great that they are "broken" and the contents of the filling chamber 16 empty into the cultivating pot. However, this does not cause the level in the cultivating pot to rise all the way to the mark shown in FIG.1. This level is reached gradually by the liquid which subsequently flows through throttling opening 28 out of storage tank 12. The liquid level finally comes to rest at a point determined by the upper limit of the slots, as shown in FIG. 1 as well.

The action described thus implies a periodic drop and rise of the liquid level in the cultivating pot, which is necessary for plants to thrive optimally. As explained at the outset, a constant liquid level in the cultivating pot would not be optimal. In the case at hand, the slots perform a sort of control function without any mechanical, moving parts or other chronometric elements being necessary.

An advantage of some importance in the case at hand is that the height of the tank may be dimensioned in such a way that an additional layer of substrate may be arranged over the tank so that the presence of the hydro-tank cannot be detected when the cultivating pot is looked at. Thus this hydro-tank also manages to meet all aesthetic demands usually made by lovers of flowers.

The upwardly extending edge 13 shown in FIG. 7 is to prevent the particles of the substrate from falling out when the insert is removed or during repotting.

Throttling opening 28 may be replaced in another embodiment of the invention by an essentially larger opening 34 in the bottom 36 of the tank 12. The required throttling effect is then obtained by forming the passage of flow following the opening so as to be accordingly narrow. In the case of a circular tank 12 with a flat bottom 36, this can be attained by arranging the bottom 38 slightly above the actual bottom of the vessel. For this purpose the tank may rest on a circular bulge or edge 40.

This measure may counteract any danger of clogging or soiling.

I claim:

1. A hydro-tank device for intermittently supplying liquid to a cultivating pot for maintaining a selected level of the liquid in the bottom of the pot, said device comprising:

a filling chamber (16) extending below the liquid level to be maintained in the bottom of the cultivating pot, said filling chamber having at least one vertical slot (24) in the lower portions thereof communicating with said pot, the height of said slot maintained the liquid level in the bottom of the pot, said slot having a horizontal width such that the liquid forms a meniscus between the edges of said slot due to its surface tension capable of sealing the slots when the liquid level in the pot drops below that in the filling chamber, said slots communicating air from the pot to said filling chamber and supplying liquid to the pot when the meniscus is intermittently broken by reduced liquid levels in the pot;

a storage tank (12) extending below the liquid level to be maintained in the cultivating pot in proximity to the bottom of the pot, said storage tank communicating with said filling chamber (16) at a liquid overflow means (22), said storage tank (12) having a small throttling opening (28) near the bottom of the tank communicating with one of said filling chamber (16) and the cultivating pot; and a filling channel (14) having a connection (20) to the storage tank in the lowr portions of the storage tank, said filling chamber (16) and . (12) being closed at their tops.

2. A hydro-tank device as in claim 1, characterized in that the device comprises an element separate from the cultivating pot.

3. A hydro-tank device as in claim 1 characterized in that the storage tank (12), the filling channel (14) and the filling chamber (16) are formed as an integral unit of annular configuration for insertion in a cultivating pot.

4. A hydro-tank device as in claim 1, characterized in that the volume of the filling chamber (16) is small relative to the volume of the cultivating pot.

5. A hydro-tank device as in claim 1 characterized in that the volume of said filling chamber (16) is small relative to the volume of said storage tank (12).

6. A hydro-tank device as in claim 1, characterized in that said the slot (24) is wider in the horizontal direction in the vicinity of the bottom of the slot than at the top.

7. A hydro-tank device as in claim 3, characterized in that the outer wall of the annular integral unit extends above the top of the storage tank.

8. A hydro-tank device as in claim 3, characterized in that the filling channel (14) has a filling opening with a funnel-shaped extension.

9. A hydro-tank device as in claim 1 characterized in that said small throttling opening (28) communicates with said filling chamber (16).

10. A hydro-tank device as in claim 1 characterized in that said small throttling opening (34–40) communicates with the cultivating pot.

* * * * *